United States Patent [19]

Mouyen

[11] Patent Number: 5,382,798

[45] Date of Patent: Jan. 17, 1995

[54] IONIZING RADIATION SENSOR USED IN A SYSTEM OF RADIOGRAPHIC IMAGING

[76] Inventor: Francis Mouyen, Chemin de Gojousse, Vielle-Toulouse, France, F-31320

[21] Appl. No.: 941,082

[22] PCT Filed: Feb. 11, 1992

[86] PCT No.: PCT/FR92/00118

§ 371 Date: Dec. 10, 1992

§ 102(e) Date: Dec. 10, 1992

[87] PCT Pub. No.: WO92/13492

PCT Pub. Date: Aug. 20, 1992

[30] Foreign Application Priority Data

Feb. 11, 1991 [FR] France ............... 91 01971

[51] Int. Cl.$^6$ ............................................. G01T 1/20
[52] U.S. Cl. ............... 250/370.11; 250/366; 250/367; 250/368; 250/370.09
[58] Field of Search ........... 250/366, 367, 368, 370.09, 250/370.11, 485.1, 486.1, 483.1, 361 R; 378/39, 62

[56] References Cited

U.S. PATENT DOCUMENTS

| | | | |
|---|---|---|---|
| 3,032,657 | 5/1962 | Meier et al. | 250/486.1 |
| 3,507,734 | 4/1970 | Ruderman | 250/370.09 |
| 4,560,877 | 12/1985 | Hoffman | 250/368 X |
| 4,593,400 | 6/1986 | Mouyen | 378/99 |
| 4,694,177 | 9/1987 | Akai | 250/368 |
| 5,015,861 | 5/1991 | Derenzo et al. | 250/361 R |
| 5,047,642 | 9/1991 | Pleyber et al. | 250/368 |
| 5,057,692 | 10/1991 | Greskouich et al. | 250/361 R |
| 5,220,170 | 6/1993 | Cox et al. | 250/370.11 |

FOREIGN PATENT DOCUMENTS

| | | | |
|---|---|---|---|
| 3920447 | 1/1991 | Germany. | |
| 2034148 | 5/1980 | United Kingdom | 253/363.10 |
| 2167279 | 5/1986 | United Kingdom | 250/367 |

OTHER PUBLICATIONS

Nuclear Instruments and Methods in Physics Research, vol. A257 No. 3, Jul. 1, 1987, P. Sonderegger, "Fibre Calorimeters: dense, fast radiation resistant", pp. 523–527.

*Primary Examiner*—Constantine Hannaher
*Assistant Examiner*—Edward J. Glick
*Attorney, Agent, or Firm*—Auslander & Thomas

[57] ABSTRACT

Ionizing radiation sensors, such as X-ray or Gamma-ray sensors, used in industrial or medical radiology imaging systems. The sensor (1) employs a charge-coupled device (20) coupled to a scintillator element (51) and a filter for impeding the passage of ionizing radiation not transformed by the scintillator element (51). The filter is formed by the combination of a non-optical element which consists of a group of tubular guides (40), wholly or partly metallic, and the scintillator element (51) which consists of a scintillator material charged with absorbant particles (52). The scintillator element (51) is housed in the non-optical element (40). The sensor (1) is particularly usable in the field of intra-oral dental radiology.

10 Claims, 2 Drawing Sheets

FIG.3
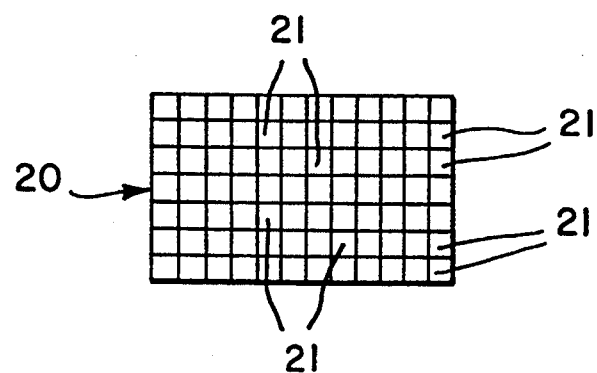
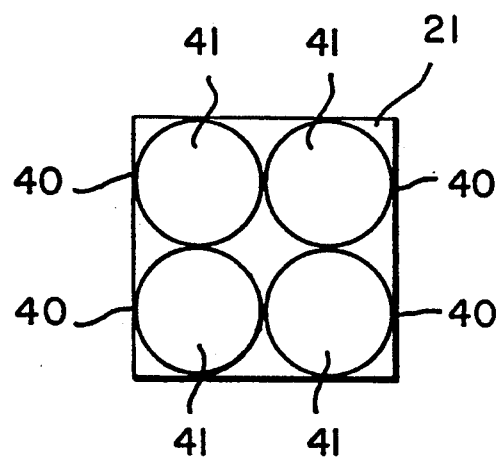
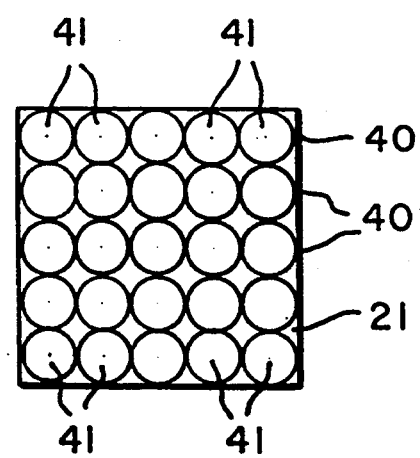
FIG.4
FIG.5

IONIZING RADIATION SENSOR USED IN A SYSTEM OF RADIOGRAPHIC IMAGING

BACKGROUND OF THE INVENTION

1. Field of the Invention

The present invention relates to ionizing radiation sensors, such as X or gamma ray sensors, used in industrial or medical radiographic imaging systems.

2. Description of the Related Art

A sensor of this kind, used for some years in intra-oral dental radiology in an apparatus that permits displaying in real time on a screen the radiographic data furnished and marketed under the designation Radiovisiographie ®, has been described notably in European Patent No. 0,129,451 and in U.S. Pat. No. 4,593,400 in the Applicant's name.

Schematically such a sensor comprises a charge transfer array device, also known as a charged-coupled device, (CCD), coupled to a scintillator element and a filter means to impede the passage of the X-rays not transformed by the scintillator element into rays of visible wavelength.

In the sensor in question this filter means is a screen formed by optic fibers provided with metal oxide particles intended to absorb the energy of the X-rays not transformed by the scintillator.

Although the data obtained with a sensor of this type are particularly reliable and workable without reservation by the practitioner, the fact remains that the thickness which must necessarily be given to the screen, for it to fully play its role of filter, constitutes a dimensional limitation affecting the size of the sensor to some extent.

This limitation is overcome with the sensor of the invention which makes use of a means ensuring not only a function of filtering but also of guiding the radiations, the latter function contributing in large measure, as will be understood on reading the description below, to the formation of high quality pictures.

SUMMARY OF THE INVENTION

More precisely, the sensor of the invention is characterized in that said filter means is formed by the combination of a non-optical element consisting of a group ("bundle") of tubular guides, wholly or partly of metal, and of the scintillator element, the latter being housed in said non-optical element.

A first remark must at once be emphasized: Contrary to the sensors of the prior art, the sensor of the invention does not comprise an optic fiber system, which makes it possible notably to greatly reduce the overall dimensions of the device, this being of great interest in some applications where the space usable for the examination is limited, for example, inside the buccal cavity.

It should be made clear also that the function of guiding the radiations may be considered to be secondary. It is not realized by a system of optic fibers, as has just been emphasized, nor by the scintillattor itself, as for example in EP-A-0,423,030, but by metal tubes.

Other important characteristics and advantages of the invention will appear in the description that follows of an example of realization of an X-ray sensor according to said invention, this description being accompanied by drawings which show respectively:

BRIEF DESCRIPTION OF THE DRAWINGS

FIG. 3 is a schematic front elevation of the charge-coupled device of FIG. 1, illustrating the position of the pixels.

FIG. 4 is a schematic front elevation view of a 2:1 array of four tubular guides in a linear relationship with one pixel of the charge-coupled device of FIG. 3.

FIG. 5 is a schematic front elevation view of a 5:1 array of twenty-five tubular guides in a linear relationship with one pixel of the charge-coupled device of FIG. 3.

DESCRIPTION OF THE PREFERRED EMBODIMENTS

Figure 1:
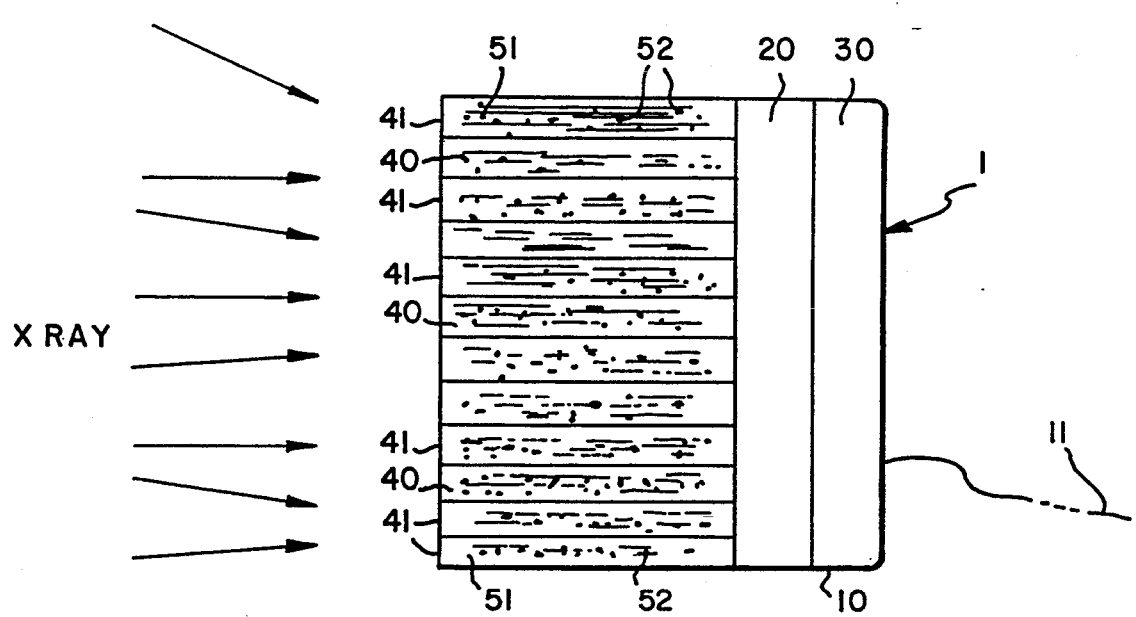
FIG. 1 is a schematic sectional view showing the relative position of the various component parts of the sensor.

Referring more particularly to FIG. 1, there is shown at 1 the sensor which is formed by a casing 10 impermeable to liquids and gases, which contains a charge coupled device 20 (CCD) coupled to a microelectronic drive and output signal amplifier (30) of the charge-coupled device 20, disposed following the latter, or said microelectronic system may be disposed laterally, said signal being transmitted to a processing and display unit (not shown) by a cable 11.

According to the teachings of the invention, the receiving face of the charge-coupled device 20, is protected by a group of tubular guides 40 having common walls and in which a scintillator element is housed. This scintillator element is formed of a conventional scintillating material 51 loaded with particles 52 able to absorb the radiation from the X-ray source and the secondary or diffuse radiation originating from the radiographed object. Preferably these absorbant particles 52 consist of metal oxides or nitrates, the relative density of the metallic element being greater than 10, for example tungsten oxides, lead oxides, tantalum oxides or barium nitrates.

These tubular guides 40 have the following structural and dimensional characteristics:

They are made, wholly or partly, of a metallic material comprising metallic elements of very high relative density, preferably higher than 10, which could be chosen from among the following metals: lead, tungsten, platinum, gold, osmium, iridium, tantalum, or a mixture of these metals.

The openings of the tubular guides 40 are aligned in a ratio of from 2:1 to 5:1 linearly in relation to each pixel 21 of the charge-coupled device 20. In other words, per pixel 21 of the charge-coupled device 20, one linearly arranges between 4 and 25 tubular guide 20 outputs from 2 by 2 up to 5 by 5 thereby obtain an excellent image resolution.

Each tubular guide 40 has an opening 41 therethrough. The height of the tubular guides 40 is about 1 mm but may, depending on the applications and as a functtion of the needs of attenuation of the energy radiations, and may be between 0.5 and 4 mm. With a height of 1 mm, the total thickness of the sensor will thus be between 5 and 6 mm, while it used to be 14 mm with the sensor of the prior art which integrated an optic fiber screen having a thickness of about 11 mm.

Figure 2:
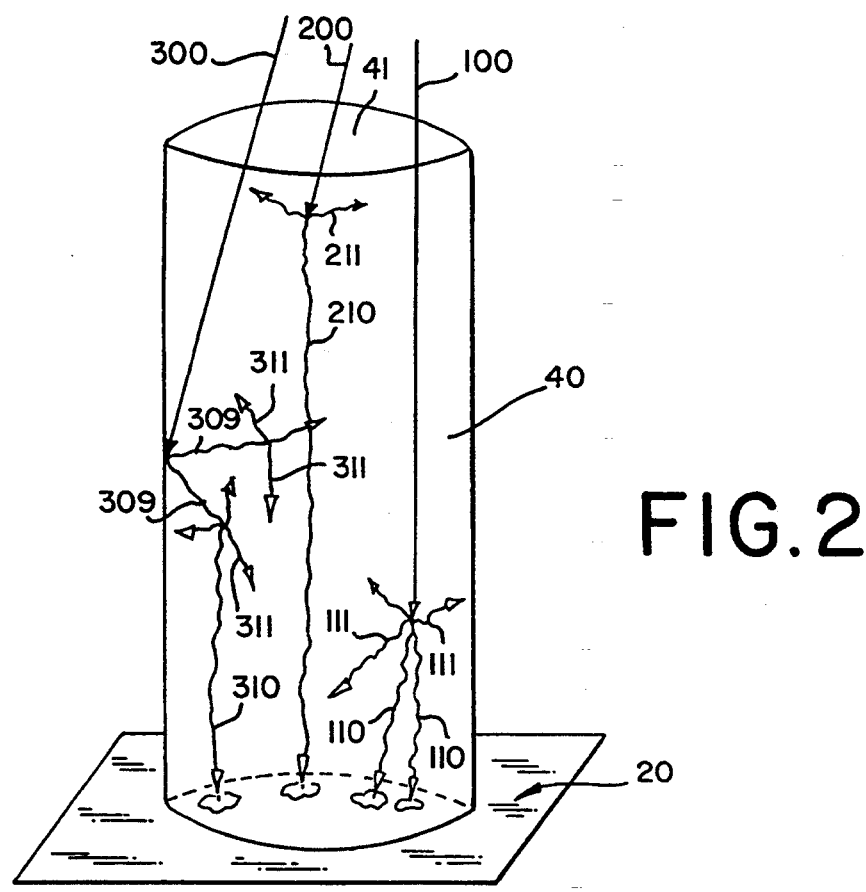
FIG. 2 is an enlarged schematic view of one of the tubular guides of the filter means and an illustration of the theoretical path of the various rays reaching the zones limited by this guide.

For a proper understanding of the role played by these tubular guides 40 in the sensor 1 of the invention, we now refer to FIG. 2 which, for greater clarity, shows only one of said tubular guides 40, disposed upstream of the receiving face of the coupled device 20.

The beam 100, a so-called "primary" beam having traversed the object to be radiographed without being absorbed, enters the opening 41 of the tubular guide 40 in a direction substantially parallel to the vertical axis thereof. The beam 100 penetrates deeply into the scintillating material 51 lining the interior of the guide 40, for, by reason of its great energy, it will be absorbed statistically only in the deep layers of the scintillating material 51 emitting light beams 110 and 111. A large part of the light beams 110 will contribute, on striking the receiving face of the charge coupled device 20, to the formation of the image, while the beams 111 will be totally absorbed, some of them before reaching said face.

The beam 200, a secondary or diffused beam which comes from the radiographed object itself. This beam 200, which has low energy, is statistically stopped in the high layers of the scintillating material 51 charged with absorbant particles 52 and only a very small part of the light beams 210 from this absorption can be transferred across the total thickness of the scintillating material 51 toward the receiving face of the charge coupled device 20, while the other beams (beams 211) are not detected.

The beam 300 is a primary beam of energy equivalent to that of beam 100 but which penetrates laterally into the tubular guide 40 as a result of an imperfect collimation. This beam will thus strike in the course of its path the walls of the tubular guide 40 which are lined, as stated above, with a metallic material of high relative density. The secondary beams 309 that are generated by this absorption, at the bare walls of the guide, will be transformed into beams of visible wavelength, some of which (beams 310) will reach the receiving face of the charge coupled device 20 while other beams (311) will be absorbed in the body of the scintillating material 51.

In the hypothesis that beam 300 has an angle of incidence greater than 5° relative to the axis of the tubular guides 40, the latter will be traversed giving an imprecision to the image since several tubular guides 40 might be involved, as the quality of the image is inversely proportional to the number of guides traversed by the same incident beam 300.

Examination of the diagram of FIG. 2 thus shows the dual role of filtering and guiding by the tubular guides 40 filled with scintillating material 51 and with absorbant particles 52 of the sensor of the invention.

It is seen in effect that, statistically, this assembly reduces the diffusion of the parasitic beams which come from the radiographed object itself, that it prevents a lateral penetration of the primary beams by forming an obstacle to their propagation, and that, in doing so, it limits the diffusion of the secondary beams produced by the contacts of the primary beams with said obstacle.

Such an assembly, of a much greater relative density than the system with optic fibers of the sensor described by the Patents mentioned at the beginning of this specification, offers, as has been stressed before, a much lower thickness than the earlier system, at equal protection.

In addition, its use permits to reduce notably the radiological noise due to the diffused radiation and to obtain better contrasted pictures.

It also permits to increase the efficiency of the sensor 1, as the fact of being able to enclose the scintillator element 51 in the guiding and anti-diffusion element (tubular guides 40) makes it possible to put in place a greater thickness of fluorescent substance (scintillator material 51) which thus offers a greater power of X-ray transformation.

I claim:

1. Ionizing radiation sensor usable in a radiographic imaging system, said sensor comprising a charge-coupled device coupled to a scintillator element and a filter means for impeding the passage of ionizing radiation not transformed by said scintillator element, characterized in that said filter means is formed by the combination of a non-optical element comprising a group of tubular guides, wholly or partly metallic, and of said scintillator element, said tubular guides having common walls, said scintillator element being housed in said non-optical element, said scintillator element being a scintillating material charged with absorbant particles.

2. Sensor according to claim 1, characterized in that said tubular guides are made of a metallic material comprising elements of a relative density higher than 10.

3. Sensor according to claim 2, characterized in that said charge-coupled device includes a plurality of pixels, said tubular guides include openings, and said openings of said tubular guides are linearly aligned in arrays of from 2 by 2 up to 5 by 5 per pixel.

4. Sensor according to claim 3, characterized in that the height of said tubular guides is between 0.5 and 4 mm.

5. Sensor according to claim 4, characterized in that the absorbant particles consist of metal oxides or nitrates in which the relative density of the metallic element is higher than 10.

6. Sensor according to claim 5, characterized in that said metal oxides or nitrates are chosen from a group consisting of lead oxides, tungsten oxides, tantalum oxides, or barium nitrates.

7. Sensor according to claim 2, characterized in that said metallic material is chosen from a group of metals consisting of lead, tungsten, platinum, gold, osmium, iridium, tantalum, or a mixture thereof.

8. Ionizing radiation sensor usable in a human dental intra-oral radiographic imaging system, said sensor comprising a charge-coupled device coupled to a scintillator element and a filter means for impeding the passage of ionizing radiation not transformed by said element, characterized in that said filter means is formed by the combination of a non-optical element comprising a group of tubular guides, wholly or partly metallic, and of said scintillator element, said scintillator element being a scintillating material charged with absorbant particles, said scintillator element being housed in said non-optical element.

9. Ionizing radiation sensor usable in a radiographic imaging system, said sensor comprising a charge-coupled device coupled to a scintillator element and a filter means for impeding the passage of ionizing radiation not transformed by said scintillator element, characterized in that said filter means is formed by the combination of a non-optical element comprising a group of tubular guides, wholly or partly metallic, and of said scintillator element, said scintillator element being a scintillating material charged with absorbant particles, said scintillator element being housed in said non-optical element.

10. Sensor according to claim 9, characterized in that the height of said tubular guides is between 0.5 and 4 mm.

* * * * *